Sept. 26, 1961     R. SHEPHERD     3,001,398
METERING SEPARATOR

Filed Jan. 10, 1958     2 Sheets-Sheet 1

Inventor
Roy Shepherd

Sept. 26, 1961 R. SHEPHERD 3,001,398
METERING SEPARATOR
Filed Jan. 10, 1958 2 Sheets-Sheet 2

Inventor:
Roy Shepherd
By Neil J. Drinall Atty

United States Patent Office 3,001,398
Patented Sept. 26, 1961

3,001,398
METERING SEPARATOR
Roy Shepherd, Tulsa, Okla., assignor, by mesne assignments, to Union Tank Car Company, Chicago, Ill., a corporation of New Jersey
Filed Jan. 10, 1958, Ser. No. 708,293
3 Claims. (Cl. 73—200)

The invention relates to equipment used in oil field production to separate oil and gas and to provide for accurate measuring of the volume of oil production. The type of device here under consideration has become known in the trade as metering separators.

Field experience with prior art metering separators has indicated a need for equipment more economical in first cost and subject to easy installation. A further indicated need was for geater accuracy than experienced with prior art arrangements. It will be understood that, for example, fabrication tolerances and inaccuracies and possible installation difficulties, has resulted in inaccurate measuring and variations in measured quantities from unit to unit of identical design.

Accordingly, it is a primary object of the invention to provide a metering separator having a high degree of measuring accuracy.

It is a further object of the invention to provide a separator of the type described which is comparatively economical to manufacture and easy to install.

It is a further specific object of the invention to reduce the inaccuracies in volume measurement by providing adjustable means to correct volume inaccuracies regardless of their cause.

Figure 1:
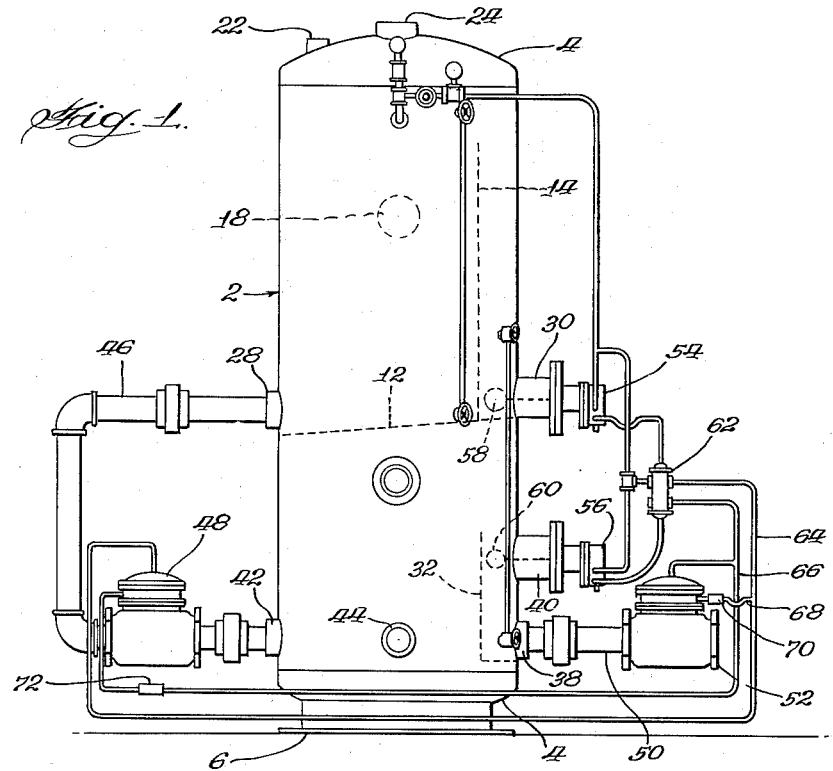
Figure 6:
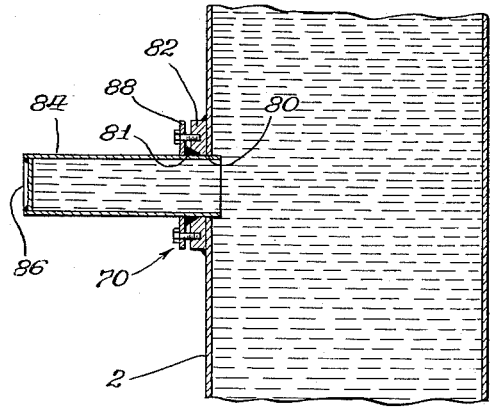
Figure 7:
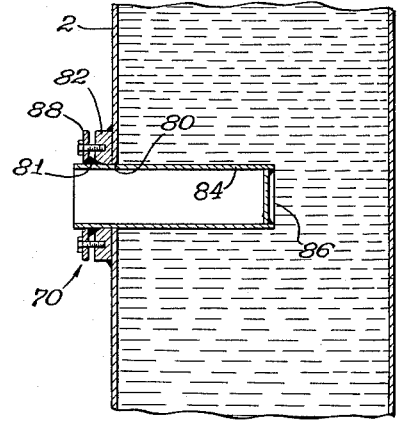
Figure 5:
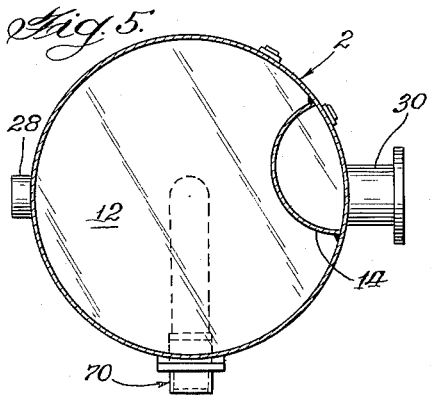
Figure 3:
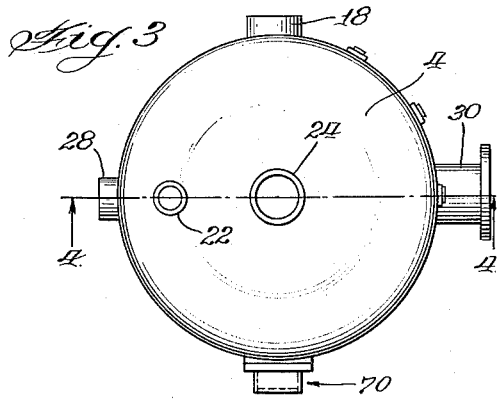
Figure 4:
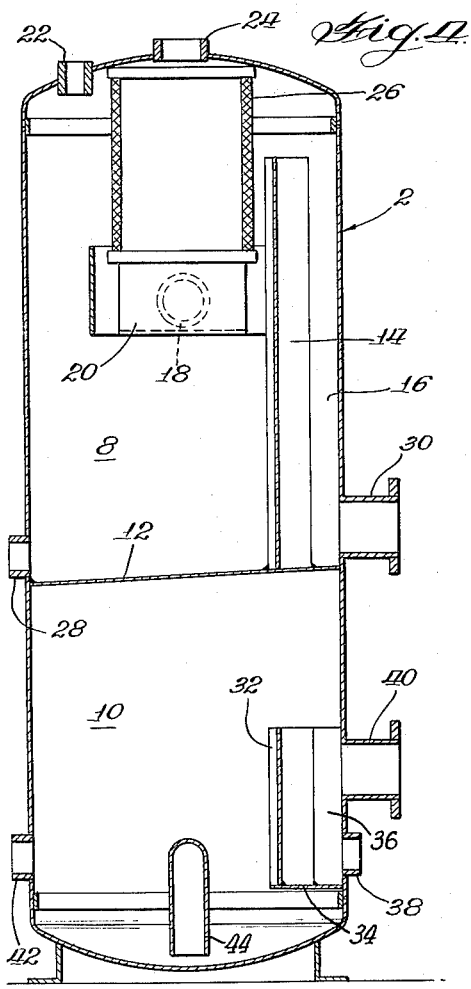
Figure 2:
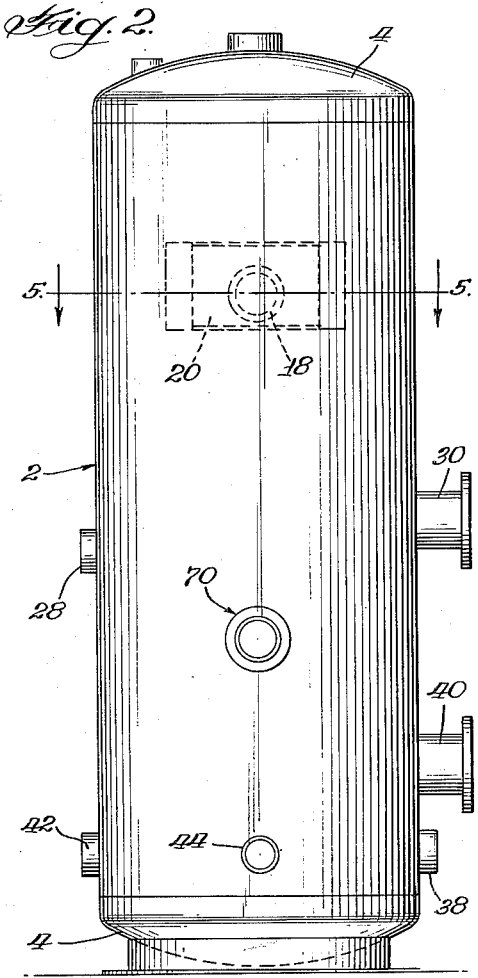

These and other objects of the invention will become apparent in the course of the following description, and from an examination of the concerned drawings, wherein:

FIGURE 1 is a side elevational view of a metering separator indicating the general arrangement, FIGURE 2 is a side elevational detail view of the separator vessel per se with operating paraphenalia removed, FIGURE 3 is a top elevational view of the structure shown in FIGURE 2, FIGURE 4 is a sectional view taken along lines 4—4 of FIGURE 3, FIGURE 5 is a sectional view taken along lines 5—5 of FIGURE 2, and FIGURES 6 and 7 are detail views of structure accommodating volume correction.

Describing the invention in detail, and directing attention to the figures, it will be seen that the metering separator comprises a main vessel, indicated generally at 2, said vessel comprising a longitudinally elongated, cylindrical tank arranged for upright installation with dished ends 4 for closing opposed ends thereof. A base structure 6 is secured to one end 4 for ease of mounting and field installation. Internally, the vessel 2 is divided into an upper or inlet chamber 8 (FIGURE 4) and a lower or metering chamber 10. This division is accomplished by a plate 12 arranged for slight upward inclination from the horizontal, and being circumferentially secured around a major portion of its periphery to an internal surface of the vessel 2. The purpose of the slight upward inclination of the plate 12 from the horizontal will be hereinafter described in detail.

A vertical, arcuately formed plate 14 may be secured at its lower end to the plate 12 and has the vertical edges thereof secured to the inner surface of the tank shell 2 in such a manner so that vertical portions thereof are spaced from and generally parallel said surface of the tank shell 2. The lower edge of the plate 14 is secured to the plate 12 and is coextensive with an opening in the plate 12 immediately adjacent the shell 2. In extending upwardly, the plate 14 defines a passage 16 to establish communication between the chambers 10 and 8. The passage 16 is effective to accomplish pressure equalization between the chambers 8 and 10 and accommodates any gas escape, as hereinafter explained in detail. An inlet port 18 communicates with the chamber 8 and a plate diverter 20 is mounted adjacent the port 18 as best seen in FIGURE 4. A relief valve port 22 may be provided in the upper head 4 to communicate with the chamber 8 and a gas outlet port 24 may also be provided, preferably at the highest point in the chamber 8. A mist extractor, of the meshed wire type, 26 is arranged to surround the gas outlet 24 and to collect any entrained liquid droplets therein that may accompany the passing gas. Further, a liquid outlet port 28 communicates with the chamber 8 immediately above the lower plate 12. A conduit 30 is provided in the shell 2 and communicates with the passage 16 immediately above the level of plate 12.

Turning to the lower chamber 10, it will be seen that a baffle plate 32 of arcuate form has its opposed vertical edges secured to the internal periphery of the shell 2, and is closed at its lower end by a horizontal plate 34 so as to provide an oil outlet compartment 36 within the chamber 10. Adjacent the bottom of the compartment 36 an outlet port 38 communicates therewith. Above the outlet port 38, another conduit 40 is provided, the purpose of which will hereinafter be explained in detail. A liquid inlet port 42 communicates with the chamber 10 along an opposite side of the vessel 2, and is in convenient relationship with the port 28 hereinbefore mentioned. A drain port 44 may also communicate with the chamber 10 adjacent the bottom thereof.

Turning to FIGURE 1, it will be seen that a pipe 46 communicates at one end with a port 28, and at its other end with a port 42. A first motor valve 48 is operatively installed in the pipe 46. The outlet port 38 communicates with an outlet pipe 50 which, in turn, has a second motor valve 52 operatively positioned therein. Float operated controller mechanisms 54 and 56 are operatively and sealingly arranged adjacent the conduits 30 and 40, and are provided with floats 58 and 60 which extend inwardly into the vessel 2. It will be understood that the controllers 54 and 56 are actuated by movement of the floats 58 and 60, respectively, which in turn are moved by the liquid level of material in the vessel 2.

It will be understood that the system here employed is essentially a pressure control system. With this in mind, it will be noted that the controllers 54 and 56 are operatively connected to a relay valve 62, said relay valve 62 having opposite sides thereof operatively connected via conduits 64 and 66 with opposite sides of the motor valves 48 and 56, respectively. The motor valves are of the diaphragm type and actuate in response to pressure differential existing on opposed sides of the diaphragm. The line 64 communicates with a line 68 going to one side of the diaphragm of the motor valve 52. The line 66 communicates directly with a similar side with the diaphragm in motor valve 48. The line 66 communicates with the upper side of the diaphragm in motor valve 52, while the line 64 communicates with a similar side of the diaphragm in motor valve 48. To aid in the action hereinafter described, delayed action check valves 70 and 72 are respectively located in the conduits 68 and 66. Thus, it will be seen that relay valve 62 provides pressure to opposed sides of the diaphragms in the respective motor valves 48 and 52.

In the operation of the arrangement, it will be understood that well fluid will enter the inlet port 18 and be distributed in the upper separation chamber 8 via the diverter arrangement 20 and in this chamber primarily, separation of oil and gas occurs—the gas going upwardly through the mist extractor 26 to gas outlet port 24. The oil from the fluid gravitates into the lower portion of the chamber 8 and is there supported by the plate 12. Oil in the compartment 8 drains through outlet portion 28 via line 46 through the diaphragm operated motor valve 48, and into the metering chamber 10 via inlet port 42. As the metering chamber 10 fills, a point is reached whereat the float 58 of the controller 54 is moved which energizes the relay valve 62, building up pressure in such a manner in the motor valves 48 and 52 that the motor valve 48 closes and the motor valve 52 opens. It will be noted that the delayed action check valve 70 is arranged so that the motor valve 52 will open shortly after the motor valve 48 has closed to avoid loss of accuracy in measured volume.

The opening of motor valve 52 drains the oil in the metering chamber 10 to a determined point whereat the float 60 is caused to move actuating the controller 56. Upon such actuation of the controller 56, the four-way relay valve 62 is reversed changing the pressure differential existing in the motor valves 48 and 52. It will be noted that the delayed action check valve 72 is such that the motor valve 52 will close shortly before the motor valve 48 opens. In this manner, a predetermined volume of oil from the metering chamber 10 has been conveyed to storage via the outlet pipe 50. It will be understood that the points of actuation of the controller valves 54 and 56 in response to float action are accurately predetermined to insure the measuring of a predetermined volume of oil. The baffle plate 32 which defines compartment 36, is provided to prevent the accidental inclusion of any water which may be mixed with the oil, but which will normally deposit itself adjacent the bottom of the chamber 10. Periodically, the water which may appear in the chamber 10 may be conveyed to waste via the drain 44.

It will be understood by those skilled in the art that further separation of oil and gas may occur in the metering chamber 10. Recalling that the plate 12 which separates the chambers 8 and 10 is inclined slightly upwardly toward the horizontal and the passage 16, it will be understood that any separation of gas within the chamber 10 will result in the gas being conveyed via passage 16 to the chamber 8, and thence through the mist extractor to the gas outlet. The inclination of the plate 12 prevents the gas from collecting in the metering chamber 10 which also could result in measurement inaccuracies.

Recalling that prior art experience with separators having a metering function indicated a major difficulty in providing consistent and highly accurate volume measurement, specific attention will be given to the metering chamber volume adjuster, indicated generally at 70 and shown in detail in FIGURES 6 and 7. First, it will be noted that this volume adjustment is located intermediate horizontal planes passing through conduits 30 and 40 which, in effect, define the points of actuation of the controllers 54 and 56.

Directing attention to FIGURES 6 and 7, it will be seen that an aperture 80 may be provided in the tank 2. On the outer surface of the tank, a suitable mounting flange 82 may be affixed to immediately surround the aperture 80. The flange 80 accommodates a packing gland-flexible gasket arrangement 81. The volume adjuster may further comprise an elongated hollow member 84 which may be received in the aperture 80. One end of the member 84 is closed with a liquid tight mounted plate 86. A follower ring 88 is movably related to the member 84, the purpose of which will be hereinafter described in detail.

Noting particularly FIGURE 6, it will be seen that the member 84 is positioned with its open end directed inwardly of tank 2. In this position, the follower ring 88 may be pulled down toward the flange 82 via the illustrated screws whereby the member 84 is frictionally and sealingly held in the shown position. This, of course, enables almost the entire hollow volume of the member 84 to communicate with the chamber 10, thereby increasing its volume by approximately the volume of the member 84.

Noting FIGURE 7, it will be seen that the member 84 is reversed whereby the closed end of same is directed inwardly of the tank 2. The obvious effect is to reduce the volume of chamber 10 by somewhat less than the volume of the member 84.

It will be readily apparent that positions of the member 84 intermediate those shown in FIGURES 7 and 8 proportionately vary the volume of chamber 10 intermediate the extreme positions shown. It will thus be apparent that the volume of chamber 10 may be selectively varied both at original installation and subsequently during use to maintain the desired accuracy of the measured liquid passing through the arrangement.

The invention as shown is by way of illustration and not limitation, and may be subject to modification without departing from the spirit thereof or the scope of the appended claims.

What is claimed is:

1. A metering separator comprising a vertical closed tank, plate means located intermediate the ends of said tank to provide a separation chamber and a metering chamber, a second plate means vertically arranged in the tank and coacting with said first plate means to provide a first passageway means between the metering chamber and the separation chamber, said first plate means being inclined to the horizontal to guide gas in the metering chamber into said first passageway means, inlet means associated with said tank to accommodate flow of fluid into the separation chamber, second passageway means interconnecting the separation chamber and the metering chamber, outlet means associated with said closed tank to accommodate flow of fluid out of the metering chamber, a first motor valve operatively connected with the second passageway means, a second motor valve operatively connected with the outlet means, a first controller means including a float arrangement located in said first passageway means, a second controller means vertically spaced from the first controller means and including a float arrangement located in said metering chamber, relay valve means operative in response to the first and second controller means for controlling the operation of the first and second motor valves, first and second delay check valve means respectively operatively connected between said relay valve means and said first and second motor valves, said delay check valve means being operable to slightly delay the energizing of one of said motor valves until the other of the motor valves is de-energized in response to operation of one of said controller means, and baffle plate means located adjacent said outlet means to prevent water collected in the bottom of the metering chamber from passing through the outlet means.

2. A metering separator comprising a vertical closed tank, means located intermediate the ends of said tank to provide a separation chamber and a metering chamber, means located entirely within said separator to provide a first passageway means for accommodating gas flow between the metering chamber and the separation chamber, inlet means associated with said tank to accommodate flow of fluid into the separation chamber, second passageway means for accommodating liquid flow between the separation chamber and the metering chamber, outlet means associated with said closed tank to accommodate flow of fluid out of the metering chamber, a first motor valve operatively connected with the second passageway means, a second motor valve operatively connected with the outlet means, a first controller including a float arrangement located in said metering chamber, a second controller vertically spaced from the first controller and including a float arrangement in fluid communication with said metering chamber, relay valve means operative in response to the first and second controllers for controlling the operation of the first and second motor valves, a first conduit means interconnecting said relay valve means and both of said first and second motor valves, first delay check valve means located in said first conduit means in operative relation to said first motor valve and in non-operative relation to said second motor valve, a second conduit means interconnecting said relay valve means and both of said first and second motor valves, and second delay check valve means located in said second conduit means in operative relation to said second motor valve and in non-operative relation to said first motor valve, said delay check valve means being operable to slightly delay the energizing of one of said motor valves until the other of the motor valves is de-energized in response to operation of one of said controllers and associated relay valve means.

3. A metering separator comprising a vertical closed tank, plate means located intermediate the ends of said tank to provide a separation chamber and a metering chamber, a second plate means vertically arranged in the tank and coacting with said first plate means to provide a first passageway means between the metering chamber and the separation chamber, said first plate means being inclined to the horizontal to guide gas in the metering chamber into said first passageway means, inlet means associated with said tank to accommodate flow of fluid into the separation chamber, second passageway means interconnecting the separation chamber and the metering chamber, outlet means associated with said closed tank to accommodate flow of fluid out of the metering chamber, a first motor valve operatively connected with the second passageway means, a second motor valve operatively connected with the outlet means, a first controller means including a float arrangement located in said first passageway means, a second controller means vertically spaced from the first controller means and including a float arrangement located in said metering chamber, relay valve means operative in response to the first and second controller means for controlling the operation of the first and second motor valves, and first and second delay check valve means respectively operatively connected between said relay valve means and said first and second motor valves, said delay check valve means being operable to slightly delay the energizing of one of said motor valves until the other of the motor valves is de-energized in response to operation of one of said controller means.

References Cited in the file of this patent
UNITED STATES PATENTS

| | | |
|---|---|---|
| 1,666,666 | Pew | Apr. 17, 1928 |
| 2,061,175 | Staber | Nov. 17, 1936 |
| 2,211,282 | McKeever | Aug. 13, 1940 |
| 2,773,556 | Meyers et al. | Dec. 11, 1956 |
| 2,831,350 | Banks et al. | Apr. 22, 1958 |
| 2,866,516 | Shepherd | Dec. 30, 1958 |
| 2,872,817 | Pitts | Feb. 10, 1959 |
| 2,882,724 | Smith | Apr. 21, 1959 |